UNITED STATES PATENT OFFICE.

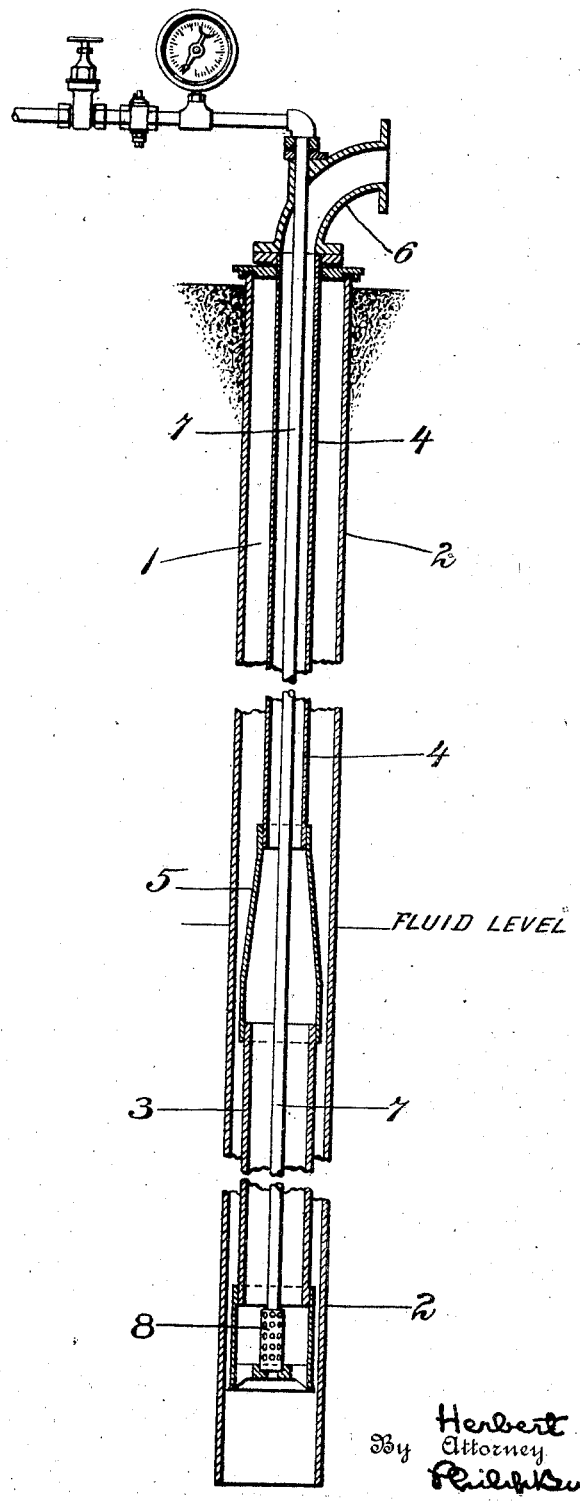
H. T. ABRAMS.
APPARATUS FOR ELEVATING FLUIDS BY COMPRESSED AIR.
APPLICATION FILED JULY 3, 1915.
1,302,268. Patented Apr. 29, 1919.

HERBERT T. ABRAMS, OF ORANGE, NEW JERSEY, ASSIGNOR TO INGERSOLL-RAND COMPANY, OF JERSEY CITY, NEW JERSEY, A CORPORATION OF NEW JERSEY.

APPARATUS FOR ELEVATING FLUIDS BY COMPRESSED AIR.

1,302,265.

Specification of Letters Patent.

Patented Apr. 29, 1919.

Application filed July 3, 1915. Serial No. 37,625.

*To all whom it may concern:*

Be it known that I, HERBERT T. ABRAMS, a citizen of the United States, residing at Orange, in the county of Essex and State of New Jersey, have invented a certain new and useful Improvement in Apparatus for Elevating Fluids by Compressed Air, of which the following is a specification.

This invention relates to apparatus for elevating liquids by means of compressed air, and more particularly to apparatus of the type such as shown, for instance, in the patent to Pohle, No. 487,639 granted December 6th, 1892, in which the liquid is raised by injecting compressed air into the lower end of a vertical pipe or conduit submerged for a part of its length in the liquid to be elevated.

In the apparatus shown in the Pohle patent mentioned above the pipe or conduit through which the liquid is elevated is of the same diameter throughout its length, and the compressed air introduced at the bottom flows upwardly, carrying with it a quantity of fluid and constantly expands and increases in velocity from the bottom of the tube to the top where it discharges together with the fluid carried with it at comparatively little above atmospheric pressure.

In the practical use of apparatus of this construction it has been found that the necessary submergence of the conduit below the surface of the fluid is considerable, although it decreases with the lift, being about 66% of the total length of the conduit for a lift of twenty feet and about 41% for a lift of five hundred feet, the amount of pressure necessary to inject the air into the bottom of the conduit, of course, varying directly with the amount of submergence.

In an apparatus of this construction the theoretical efficiency is not high on account of a large loss by what is known as the "slip of the air bubble", due to the bubbles of air passing through the fluid without carrying a proper amount of fluid upward with them.

The object of this invention is to obtain a higher efficiency by reducing the effect of this slippage, and the invention consists, broadly speaking, in constructing the lower submerged portion of the conduit of considerably larger diameter than the discharge pipe, so that the air injected into the lower end of the conduit produces a comparatively slowly upward moving column of aerated fluid which when it passes into the upper smaller diameter discharge pipe receives an immediate and considerable increase in velocity which is gradually increased to the point of discharge, the high velocity throughout the discharge pipe reducing the loss of energy due to "slip" to a considerable extent. The principal result of the increase in efficiency is found in the fact that with this construction the submergence of the conduit in the fluid can be considerably decreased with a corresponding decrease in the air pressure required to effect a specified lift.

A practical embodiment of the invention is shown in the accompanying drawing, in which the figure shows a vertical longitudinal section through the apparatus.

As shown in the drawing, the apparatus is placed in a well 1, which is shown as provided with a casing 2. Submerged in the fluid is an elongated tubular pipe section 3, which constitutes the aerating chamber. This is shown as nearly the diameter of the well casing 2. Extending upwardly from this is a discharge pipe 4, which is of considerably smaller diameter and is connected with the upper end of the aerating chamber 3 by a tapering nozzle or connecting piece 5, the taper of this connecting piece 5 being sufficiently gradual to allow the fluid and air to pass from the aerating chamber to the smaller diameter discharge pipe without shock or eddies. To the upper end of the discharge pipe 4 is connected an elbow 6 which receives and directs the discharge of the aerated fluid to any desired receiver or conduit. Secured in the elbow 6, and passing concentrically down through the discharge pipe 4 and the aerating chamber 3 to the bottom of the aerating chamber 3 is the air inlet pipe 7. This air inlet pipe 7 terminates in a perforated portion 8 inside the lower end of the aerating chamber 3.

In operation, air under pressure sufficient to overcome the pressure of the fluid in the lower end of the aerating chamber is admitted through the perforated portion 8 of the tube 7 into the lower end of the aerating chamber. The amount of air admitted is of course in proportion to the size of the discharge pipe and the desired output of fluid. The diameter of the aerating chamber is, however, calculated so that the air admitted to the aerating chamber will produce an aerated mass of fluid with a comparatively slow upward movement in the aerating chamber 3, the velocity of this column increasing gradually toward the top of the aerating chamber as the compressed air expands. When the aerated mixture reaches the top of the aerating chamber it passes through the tapering connecting piece 5 into the discharge pipe 4, and by reason of the considerable decrease in cross section of the upwardly moving column, the velocity of the upwardly moving column is rapidly and substantially increased so that it passes throughout the length of the discharge pipe with a considerably heightened velocity which gradually increases as the column reaches the top of the discharge pipe. By reason of this increased velocity the "slip" of the air past the fluid is considerably reduced and the efficiency of the apparatus correspondingly increased. The increase in efficiency enables the submerged portion of the conduit, in this case the aerating chamber 3, to be of considerably less length than in an apparatus of the old type designed to lift the same amount of fluid the same distance. This not only enables fluid at a less pressure to be used for elevating the column, but also enables fluid to be lifted with less submergence of the apparatus than previously, the advantages of which are obvious. Also, for a given submergence and pressure a greater output of fluid can be obtained with the same amount of air. In practice it has been found that the aerating chamber should extend to the surface of the fluid, or slightly thereunder, to secure the best results, although this is not essential. The aerating chamber, however, should not extend any great distance either above or below the surface of the fluid, as the increased size of the aerating chamber above the surface of the fluid would tend to produce a larger amount of "slippage", while a decrease of the total volume of the aerating chamber is disadvantageous, as it prevents the necessary expansion of the air.

Although the air inlet pipe is here shown as passing centrally through the fluid conduit, it is obvious that any of the well known forms of piping in which the air conduit leads to the lower end of the fluid conduit along the outside thereof could be used without invention, and it is to be understood that while the present showing and description discloses only one specified modification of the invention, other forms and modifications are included within the spirit and scope thereof, as expressed in the appended claim.

What I claim is:

An eduction pipe for air lifts, the cross section of which varies in steps and the minimum cross section of which is adapted to be disposed substantially at the water level when the pipe is operatively disposed while the maximum cross section is adapted to be submerged.

In testimony whereof, I have hereunto set my hand.

HERBERT T. ABRAMS.